(No Model.) 7 Sheets—Sheet 3.
T. M. MACNAIR & F. WOOD.
TUBE MACHINE.
No. 443,601. Patented Dec. 30, 1890.
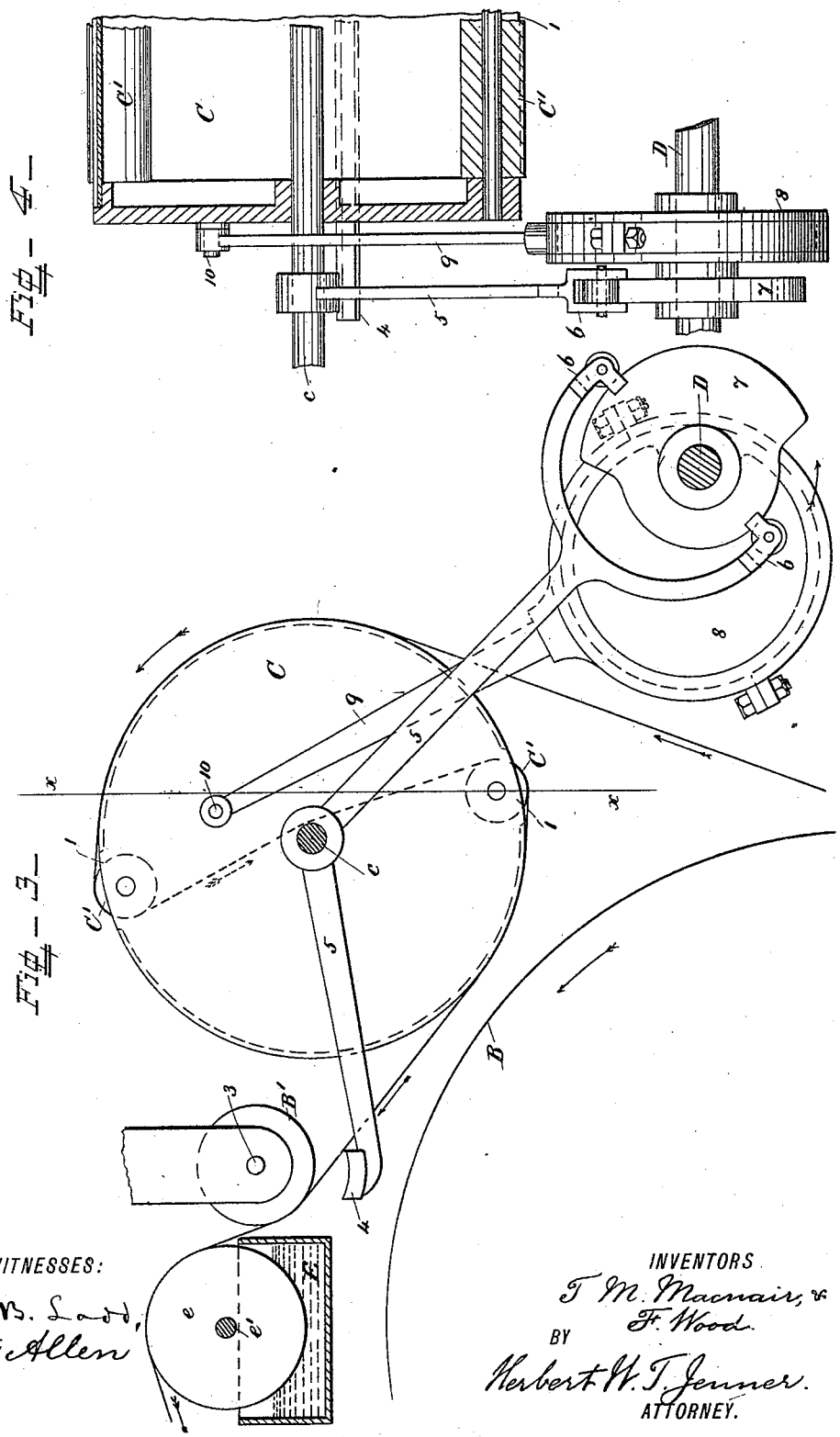
WITNESSES:
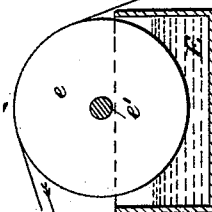
INVENTORS
T. M. Macnair, &
F. Wood.
BY
Herbert W. T. Jenner.
ATTORNEY.

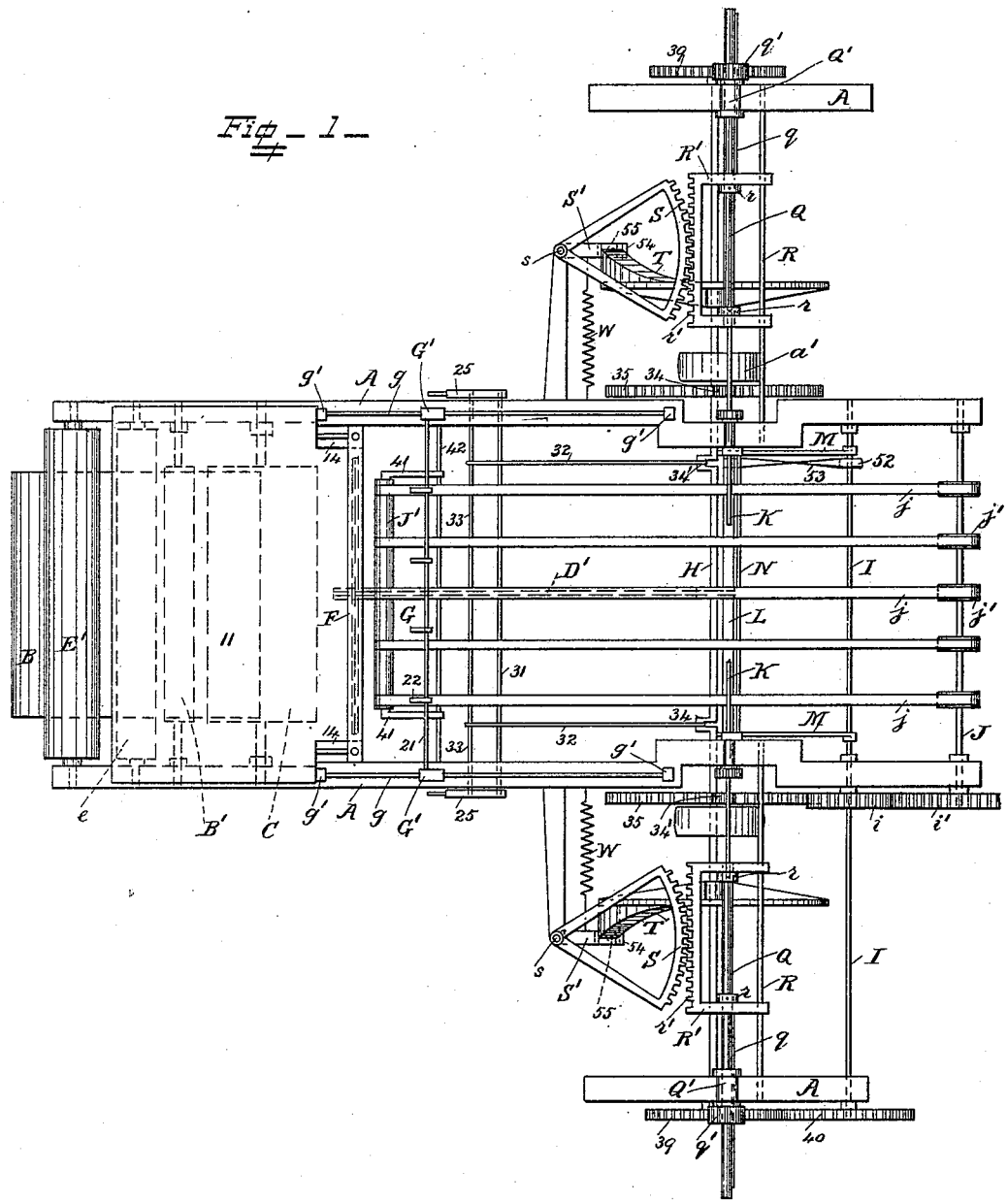

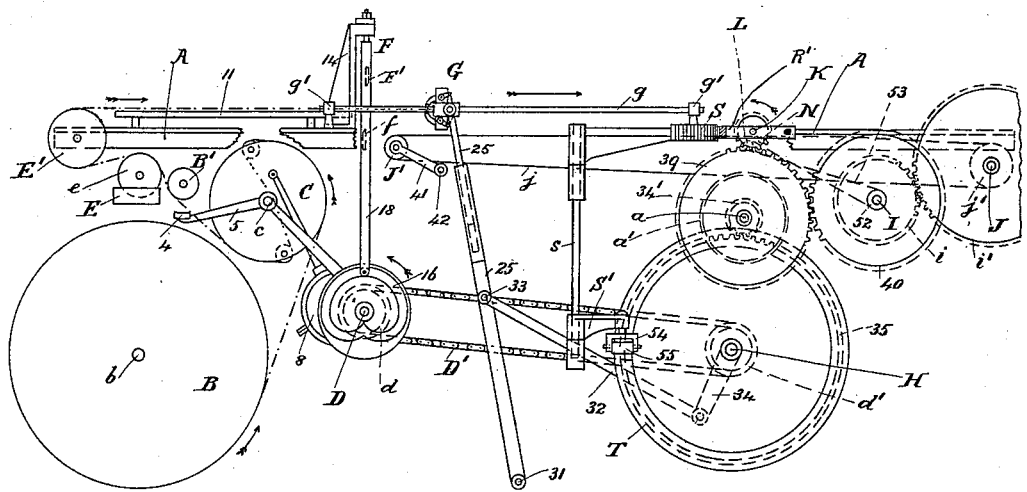

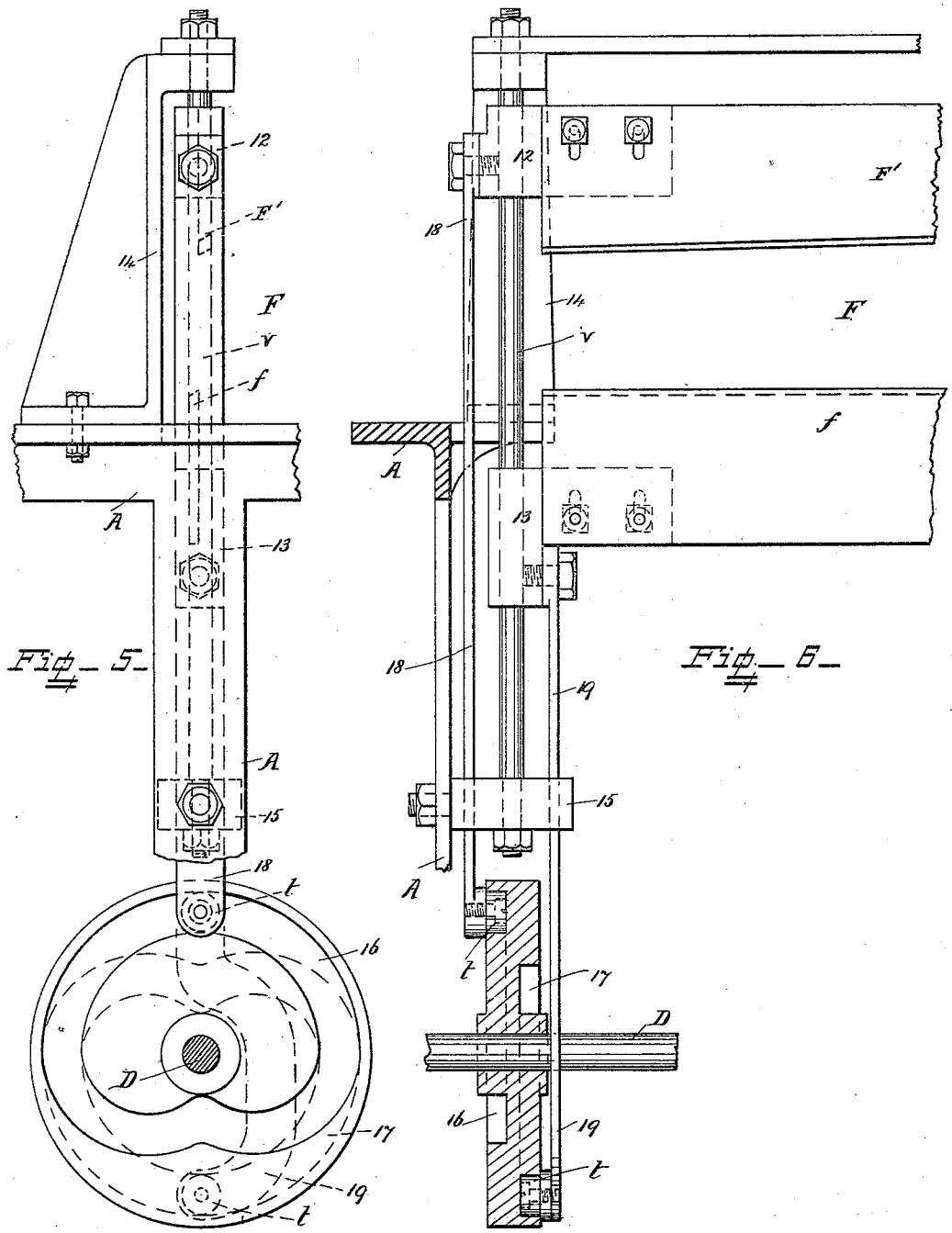

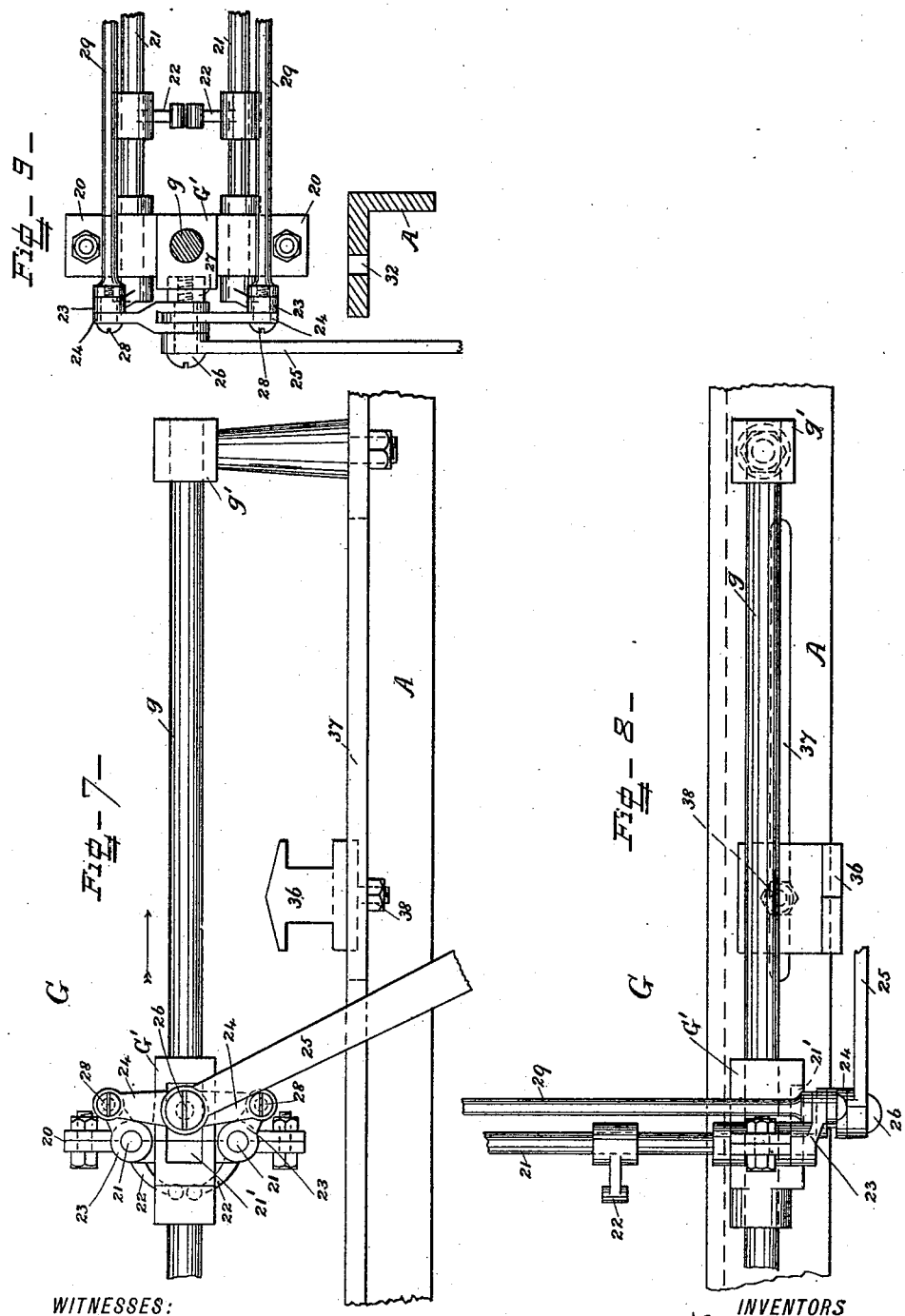

(No Model.) 7 Sheets—Sheet 6.
T. M. MACNAIR & F. WOOD.
TUBE MACHINE.
No. 443,601. Patented Dec. 30, 1890.
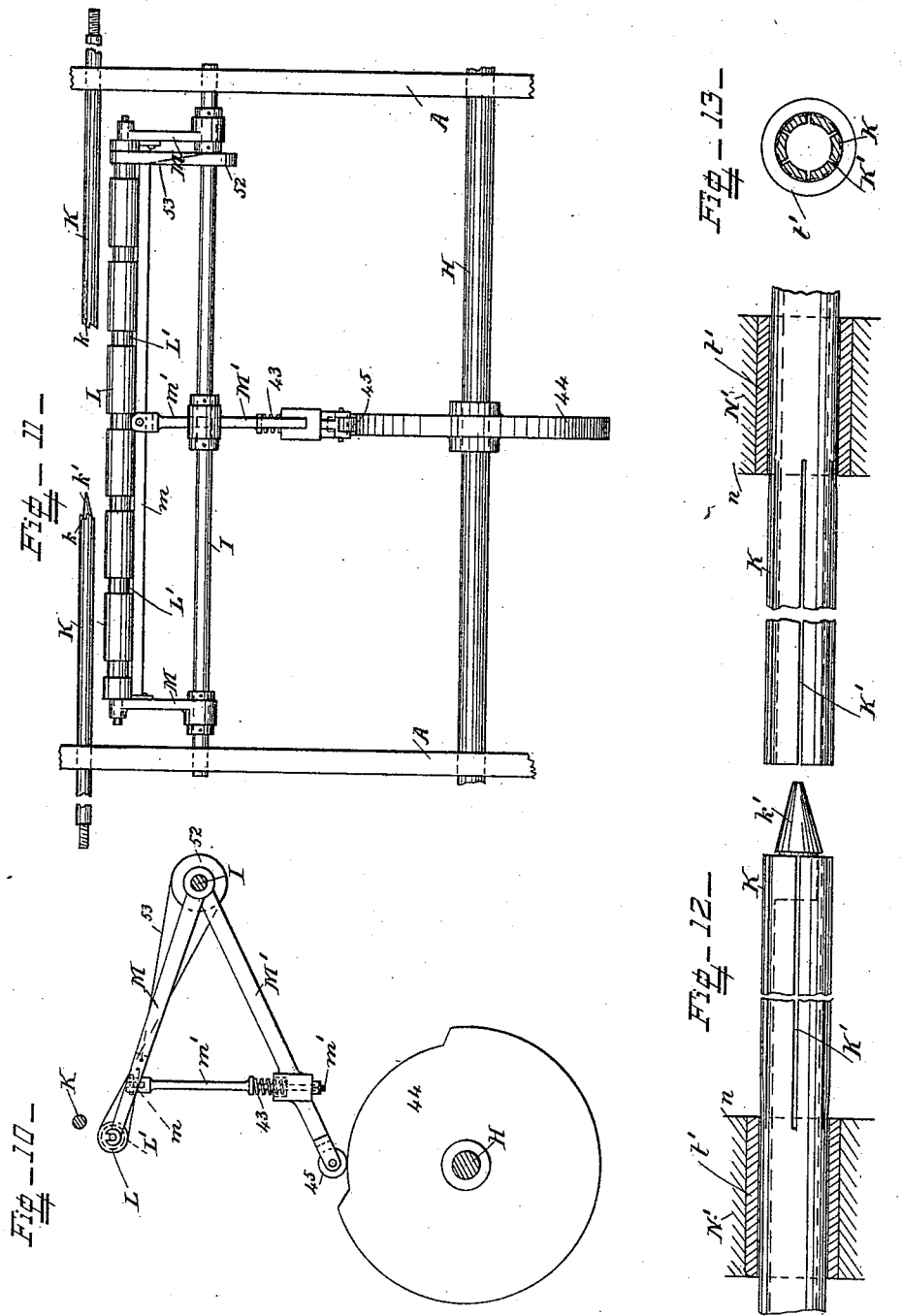
WITNESSES:
INVENTORS
T. M. Macnair,
F. Wood
BY
Herbert W. T. Jenner
ATTORNEY.

(No Model.) 7 Sheets—Sheet 7.
T. M. MACNAIR & F. WOOD.
TUBE MACHINE.
No. 443,601. Patented Dec. 30, 1890.
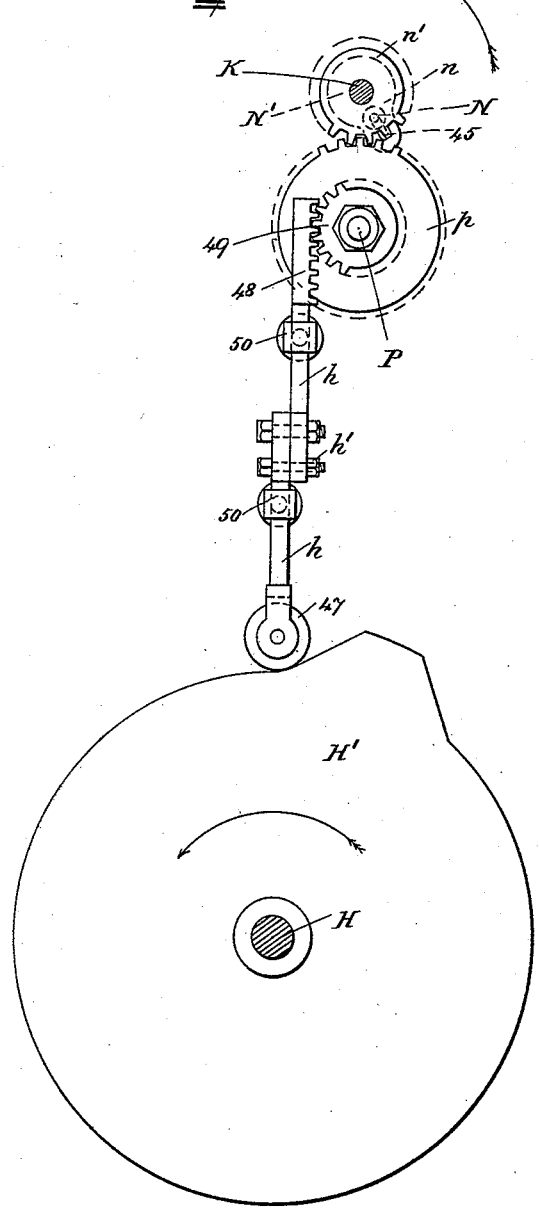
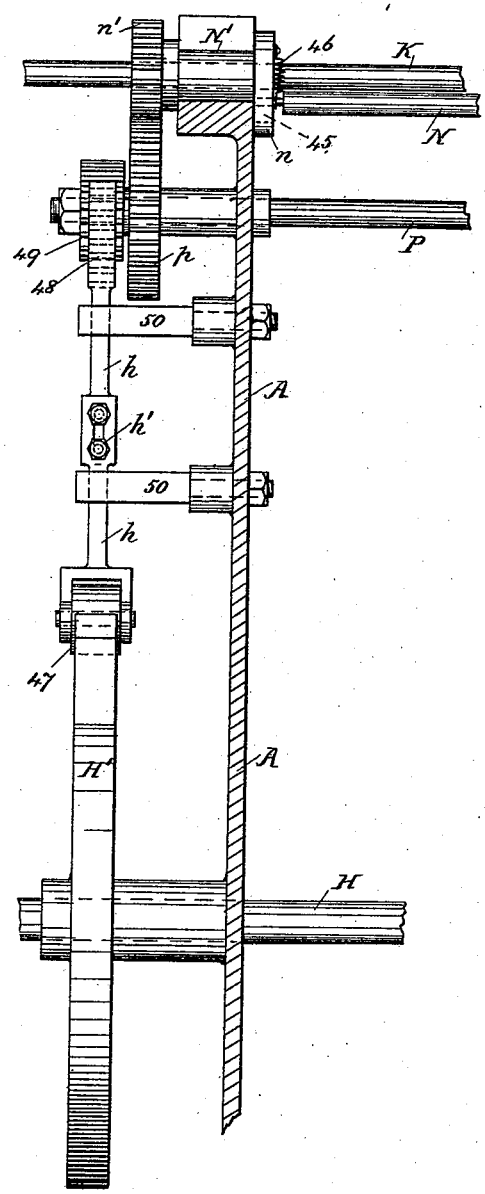
WITNESSES:
Story B. Ladd,
Walter Allen
INVENTORS
T. M. Macnair, &
F. Wood.
BY
Herbert W. T. Jenner.
ATTORNEY.

UNITED STATES PATENT OFFICE.

THOMAS M. MACNAIR AND FRANCIS WOOD, OF BROOKLYN, NEW YORK.

TUBE-MACHINE.

SPECIFICATION forming part of Letters Patent No. 443,601, dated December 30, 1890.

Application filed June 2, 1890. Serial No. 353,991. (No model.)

*To all whom it may concern:*

Be it known that we, THOMAS M. MACNAIR and FRANCIS WOOD, citizens of the United States, residing at Brooklyn, in the county of Kings and State of New York, have invented certain new and useful Improvements in Tube-Machines; and we do hereby declare the following to be a full, clear, and exact description of the invention, such as will enable others skilled in the art to which it appertains to make and use the same.

This invention relates to machines used in the manufacture of tubes or cylinders of rolled paper or other similar material, said tubes being adapted for use as cases for fireworks, for mailing-tubes, and for many other purposes.

This invention consists in the novel construction and combination of the parts hereinafter fully described and claimed.

In the drawings, Figure 1 is a plan view from above of the entire machine. Fig. 2 is a side view of the entire machine, its various parts being shown in the form of a diagram, with the side frames left out for clearness. Fig. 3 is a side view of the devices for unwinding the paper from the roll and pasting it, and Fig. 4 is a cross-section taken on the line $x\,x$ in Fig. 3. Fig. 5 is a side view of the devices for cutting off the paper; and Fig. 6 is an end view of the said devices, showing the double cam in section. Fig. 7 is a side view of the gripping devices for seizing the paper and drawing it forward. Fig 8 is a plan view of the same, and Fig. 9 is an end view of the said devices. Fig. 10 is a side view of the devices for feeding the paper to the mandrel, and Fig. 11 is an end view of the same. Fig. 12 shows a modification in the construction of the mandrel, and Fig. 13 is a cross-section through the same. Fig. 14 is a side view of the auxiliary feed or press roller under the mandrel and its actuating mechanism, and Fig. 15 is an end view of the same.

A is the frame of the machine, and $a$ is the driving-shaft journaled in said frame and provided with the driving-pulley $a'$.

B is a roll of paper or other similar material from which the tubes can be made, mounted on the shaft $b$, which is journaled in the frame A so as to turn freely.

C is a hollow cylinder for unwinding the paper from the roll B. This cylinder is mounted upon the shaft $c$, and is provided with openings 1 at its circumference, so that the paper may pass diametrically through it. C' are rollers journaled in the sides of said cylinder for the paper to pass over in entering and leaving the cylinder.

B' is the brake-roller mounted on the shaft 3, which is journaled in the frame, and 4 is the brake for pressing the paper against the surface of the roller B'. The brake 4 is secured to the ends of two similar brake-levers 5, which are pivoted upon the shaft $c$ at each end of the unwinding-cylinder. The other ends of the brake-levers 5 are provided with forks 6, which engage with the revoluble cams 7. The cams 7 are secured upon the shaft D, which is journaled in the frame and provided with the chain-wheel $d$ and drive-chain D', for imparting motion to it, as will hereinafter be more fully described.

An eccentric 8 is secured upon the shaft D, and 9 is an eccentric-rod worked by said eccentric, and having its end pivoted on the pin 10, projecting from the side of the unwinding-cylinder, so that the said cylinder may have an oscillating motion imparted to it. The paper from the roll B at the rear of the machine is passed around the front half of the unwinding-cylinder to the top of it, thence through the openings 1 to the lower side of it, and is then passed rearwardly and upwardly between the brake 4 and the brake-roller B'.

When a portion of the paper is to be unwound from roll B, the brake-levers are first turned by their cams so that the paper is gripped tightly between the brake and the brake-roller. The unwinding-cylinder is then revolved by the eccentric in the direction of the arrow, and a portion of the paper is unwound from the roll and wound upon the periphery of the said cylinder. When a sufficient length of paper to make a tube has been unwound from the roll, the brake releases the paper and the cylinder is moved in the reverse direction by the eccentric, leaving the unwound paper hanging slack and ready to be drawn over the paste-roll.

E is a reservoir for paste or other adhesive material, supported by the frame, and $e$ is the paste-roll mounted on the shaft $e'$, which is journaled in the frame A. The lower side of roll $e$ runs in the adhesive liquid contained in the paste-reservoir, and the paper passes over the top of the roll and revolves it continuously, so that a thin even coat of adhesive material is applied to the surface of the paper.

$E'$ is a guide-roll journaled at the rear of the machine. The paper is passed over this roll, and thence forwardly in the direction of the arrow, and rests upon the table 11 with its pasted side uppermost. The front end of the paper is seized and drawn forward by the reciprocating gripping devices G, which will be more fully described hereinafter. The said gripping devices have their travel adjusted so that they draw forward the length of paper which has been previously unwound from the roll B by the unwinding-cylinder, and which is hanging slack, and therefore offering no material resistance to being pulled forward, and they draw this paper forward until the slack is all taken up and the paper is tightly stretched.

F are the cutting-off devices, arranged intermediate between the gripping devices and the front end of the table 11 for cutting off the paper.

The cutting-off devices F are shown in detail in Figs. 5 and 6. $F'$ is the upper knife-blade, and $f$ is the lower knife-blade. The upper blade is bolted at each end to a block 12, and the lower blade is bolted at each end to a block 13. A standard 14 is secured to the top of the frame A, and 15 is a guide secured to the side of the frame. A vertical guide-rod $v$ has its upper and lower ends respectively secured into and supported by the standard 14 and the guide 15 at each side of the machine, and the blocks 12 and 13 slide up and down upon these vertical guides. A double cam provided with grooves 16 and 17 is secured upon the shaft D, or two separate cams may be used, if desired. A rod 18 is secured to the block 12 of the upper cutting-blade and passes through the guide 15. This rod 18 is provided with a roller $t$ at its lower end, which runs in the cam-groove 16. A rod 19 is secured to the block 13 of the lower cutting-blade, and also passes through the guide 15. This rod 19 is also provided with a roller $t$, which engages with the cam-groove 17. Similar rods and cams are provided at each side of the machine and connected to the opposite ends of the knife-blades. The cam-grooves 16 and 17 are so formed that the knife-blades will remain stationary and separated to the greatest extent of their travel apart from each other during one half of a revolution of the cam. During the remaining half-revolution the knife-blades are caused to approach and partially pass each other, thereby cutting off the paper, and the knife-blades are then caused to recede from each other until they again reach their extreme highest and lowest positions. The edge of the upper knife-blade is concave, so that it may cut off the paper from each side.

The gripping devices G are shown in detail in Figs. 7, 8, and 9. $G'$ is a cross-head sliding back and forth upon the horizontal guide $g$, which is supported by the pillars $g'$, secured to the frame A. The cross-head is preferably made in two halves provided with flanges 20, bolted together, and $21'$ is a longitudinal pocket formed in the side of the cross-head. Rock-shafts 21 are journaled in the cross-heads above and below the guides $g$ at each side of the machine and extend clear across it. Grip-levers 22 are secured in pairs to the said rock-shafts at appropriate intervals for seizing the end of the paper. Levers 23 are secured upon the ends of the rocks-shafts on the opposite side of them from the grip-levers. Links 24 are pivoted together and to the end of the actuating-lever 25 by the pin 26, and 27 is a nut screwed upon the end of the said pin and adapted to slide back and forth in the pocket $21'$. The cross-heads are formed in halves in order that the above-described parts may be easily put together and taken apart. The other ends of the links 24 are pivoted to the ends of the levers 23 by pins 28, and 29 are rods which extend clear across the machine and connect the pins 28 together, so that all the pairs of grip-levers may be caused to work simultaneously.

The actuating-lever 25 is made in two parts, and one of the parts (preferably the lower part) is provided with a tubular socket in which the other part may slide freely. The lower end of the actuating-lever is pivoted to the frame A by the rod 31. A vibrating motion is communicated to the lever 25 by means of the connecting-rod 32, which is provided with a rod 33, pivoting it to the said lever, and is driven by the crank 34.

H is a shaft journaled in the frame A and revolved from the driving-shaft $a$ by means of the toothed pinion $34'$, secured on the driving-shaft which gears into the toothed wheel 35, secured upon shaft H. The crank 34 is secured to the shaft H and actuates the gripping devices, as before described. A similar actuating-lever and crank is provided at the opposite side of the machine, so that the gripping devices are operated from each side of the machine. A chain-wheel $d'$ is also secured upon the shaft H and drives the chain $D'$, thereby revolving the shaft D and operating the unwinding-cylinder and cutting-off devices, as hereinbefore described.

When the levers 25 commence their rearward motion, the pairs of grip-levers are separated by the links, which form a sort of toggle-joint, the amount of separation being regulated by the nuts 27 striking against the rear ends of the pockets $21'$. When the levers 25 commence their forward motion, the grip-levers close upon the paper and the continued motion of the said actuating-levers draws forward the paper. The cutting-off devices then operate and cut off a sheet of the required length to form a tube. The front edge of the paper is automatically released after the grip-levers have completed their forward travel and recommence their backward movement; but in order that sheets of paper may be drawn forward and cut off to any desired length a trip-block 36 is provided. This trip-block slides back and forth in the longitudinal groove 37 in the frame A, and may be secured in any desired position by the nut 38. When the end of the lower lever 23 strikes against the inclined upper surface of the trip-block, the grip-levers are forced apart and the paper is released. Similar trip mechanism is provided upon each side of the machine.

The driving-shaft $a$ has a toothed wheel 39 secured upon it, which gears into a toothed wheel 40, secured upon a counter-shaft I, which is journaled in the frame A. The counter-shaft I has a toothed wheel $i$ secured upon it, which gears into a toothed wheel $i'$, secured upon the conveyer-shaft J, which is journaled in the front end of the frame A.

The conveyer consists of a series of endless tapes $j$, which pass over the pulleys $j'$, secured upon the shaft J, and extend horizontally under the gripping devices, passing around the roller J' at the rear of the conveyer. In order that the tapes may be kept taut, the roller J' is not journaled in the frame A, but is carried by arms 41, which are pivoted to the said frame by the shaft 42, which extends clear across the machine. The arms 41 are inclined rearwardly and upwardly, and the tapes are kept taut by the weight of the said arms and the roller J'. Just before the paper is cut off at its rear end and forms a sheet the grip-levers release its front end, and the said sheet falls upon the conveyer-tapes and is carried forward in the direction of the arrow in the drawings, with its wet pasted side uppermost, and is wound upon a mandrel to form a tube or cylinder, as will now be described.

The mandrel may consist of a smooth solid bar caused to revolve continuously, so that the paper may be wound upon it; but in order to facilitate its removal from the paper tube the mandrel K is preferably formed of two parts or halves, and is preferably hollow. The meeting ends of these parts may be provided with clutch-jaws $k$, and $k'$ is a tapering guide-pin which projects from one part and fits within the hollow portion of the other part.

Figs. 12 and 13 show a modification in the construction of the mandrel, in which the ordinary mandrel K is provided with longitudinal grooves K', extending clear through that portion of it upon which the paper is wound, and which divide it into a series of segments which may be sprung together to lessen the diameter of the mandrel, so that it may the more easily be withdrawn from the paper tube. The automatic devices for withdrawing the halves of the mandrel from the paper tubes wound upon them will be more fully described hereinafter.

The mandrel K revolves close above the tapes of the conveyer, and L is a feed-roller underneath the said tapes. This feed-roller is provided with grooves L', through which the tapes may pass without friction when the feed-roller is pressed upwardly against the mandrel.

The feed-roller L is journaled in the ends of two side arms M, the other ends of which are loosely pivoted upon the counter-shaft I. A cross-bar $m$ extends between the two side arms M, and $m'$ is a vertical rod which connects the middle of the said cross-bar with the central arm M' underneath it. A spring 43 is interposed between the end of rod $m'$ and the central arm. This spring rests in a recess in the central arm and surrounds that portion of the rod which is of smaller diameter than the main part of the rod and which passes through the arm M'. A cam 44 is secured upon the shaft H, and 45 is a roller bearing upon the said cam and journaled on a pin passing through the end of the central arm M'. When the conveyer has carried the front end of the sheet of paper under the mandrel, the cam 44 raises the feed-roller L and presses the pasted side of the paper against the mandrel. The cam holds the feed-roller L in its raised position while the paper is being wound around the mandrel and lets it down again as soon as the sheet is wound upon it. The spring 43 yields as the paper laps around the mandrel, so that the upward pressure of the feed-roller is not materially increased.

N is an auxiliary feed-roller journaled in the slots 45 of the disks $n$, which are formed upon or secured to one end of the sleeves N', which are journaled in the frame of the machine and are adapted to be removed therefrom and replaced as often as desired. A toothed pinion $n'$ is formed on or secured to the other end of each sleeve outside the frame. Springs 46 may be provided for pressing the roller N against the mandrel and permitting it to be pushed back in the slots as the paper is wound upon the mandrel, and these springs and slots also adapt the roller N to be used for mandrels of different diameters, but the tension of the tapes will operate the rollers without springs.

P is a shaft journaled in the frame A and having the toothed wheels $p$ secured upon its ends. These wheels $p$ gear into the pinions $n'$, and the continuation of the shaft P across the machine insures uniformity of motion at each end of the roller N. The devices for revolving the shaft P are the same upon each side of the machine and will now be described.

H' is a cam secured upon the shaft H, and $h$ is a vertical bar formed of two adjustable parts secured together by bolts $h'$. A roller 47 is journaled in the lower forked end of bar

*h* and bears against the cam H', and 48 is a toothed rack formed on the upper end of the said bar and adapted to gear into the toothed pinion 49, which is secured upon the shaft P. The vertical bar *h* slides in the guides 50, which are secured to the frame, and the adjustability of the length of the bar *h* permits the devices at each side of the machine to be set very accurately. When the front edge of the sheet of paper has passed through for about a quarter of an inch between the mandrel and the feed-roller, the cams H' raise the racks. This motion causes the sleeves N' to be partially revolved, and the auxiliary feed-roller N under the tapes of the conveyer is moved in the arc of a circle concentric with the mandrel and at the same speed as the paper, bending the tapes upwardly and carrying them and the paper with it. The roller N presses the pasted side of the paper upon the mandrel and holds it thereupon until the lap next to the mandrel is nearly completed. The cams H' then releases the bar *h*, and the weight of the said bars, together with the weight of the take-up roller J' pulling on the tapes, returns the auxiliary feed-roller N to its original position, the paper meanwhile continuing to be wound around the mandrel until the tube is completed.

The parts of the mandrel, as has before been stated, revolve in the sleeves N'. These parts have right and left hand screw-threads or other equivalent coupling devices upon their ends, so that they may be quickly attached to and detached from the mandrel-shafts Q. When a smaller mandrel is inserted in place of the mandrel shown, bushes *t'* are used, as shown in Figs. 12 and 13; or sleeves having holes of the same size as the said smaller mandrel may be inserted in the machine in place of those provided with holes fitting the larger mandrel. Similar devices for revolving the halves of the mandrel and withdrawing them from the paper tube are provided upon each side of the machine. Each mandrel-shaft Q is provided with a spline *q*, which engages with a keyway in the bush Q', which is journaled in an outer portion of the frame. A toothed pinion *q'* is formed on or secured to the bush Q' and gears into a toothed wheel 39, secured upon the driving shaft *a*, which extends clear across the machine. A small belt-pulley 52 is secured upon the counter-shaft I, and 53 is a driving-belt passing around said pulley and around one end of the feed-roller L, so that the said feed-roller may be continuously revolved R is a horizontal guide-bar secured to the frame A parallel with the mandrel-shaft, and R' is a carrier which slides back and forth upon the said guide-bar. The mandrel-shaft Q is journaled in the carrier and provided with the collars *r*, which cause the said shaft to move back and forth with the carrier. A toothed rack *r'* is formed on the rear of the carrier and gears into a horizontal toothed segment S. The toothed segment S is secured upon a vertical shaft *s*, which is journaled in suitable brackets, forming a part of the frame of the machine, and S' is an arm secured upon the lower part of the said shaft. The arm S' is provided with a pivoted forked bracket 54, and 55 is a roller journaled in the said forked bracket. A face-cam T is secured upon the shaft H. As soon as the tube is formed upon the mandrel the cams T push the rollers 55 outwardly upon both sides of the machine, thereby partially revolving the shafts *s* in opposite directions and simultaneously withdrawing the halves of the mandrel from the opposite ends of the tube by means of the toothed segments and the carriers. The splines cause the halves of the mandrel to revolve continuously irrespective of their horizontal movement.

W are springs secured to the arms S' and to the frame A for causing the halves of the mandrel to approach and engage with each other as soon as the rollers 55 are relieved from the operation of the face-cams.

If the two parts of the mandrel commence to be withdrawn simultaneously and at equal speed, there will be little or no pressure upon either end of the newly-formed tube, which is wet and rather soft; but if the gear upon one side should act slightly in advance of the gear upon the other side, or if the tube should stick tighter to one part of the mandrel than to the other, one end of the tube will be pressed against one of the disks *n*, which may raise a burr upon the end of the tube. In the modification shown in Figs. 12 and 13 this difficulty is overcome by making the parts of the mandrel of spring-segments, as before described, and by forming that portion of it upon which the paper is wound very slightly larger in diameter than those parts which revolve in the disks *n* when the two halves of the mandrel are coupled together. The difference in diameter of these parts need be very little, and one must swell gently into the other without forming any shoulder. As soon as one half of the mandrel commences to be withdrawn through the sleeve its enlargement will enter the hole of the sleeve or bush, and as it normally fits more tightly therein and keeps on revolving the spring-segments of the mandrel will be pressed together and will cease to bear tightly upon the inner surface of the tube. The tapered pin portion on the end of one part of the mandrel holds the mandrel perfectly cylindrical from end to end while the paper is being wound upon it. When the mandrel is withdrawn from the tube, the latter falls upon the conveyer and is carried along thereby and discharged out of the machine at its front end.

We do not confine ourselves to the use of the driving-wheels and shafts which we have described and shown, as various arrangements of gearing may be provided to give similar results and operate the different portions of the machine at the proper intervals.

It is obvious that by merely disconnecting the drive-chain D' the unwinding-cylinder and cutting-off devices F may be thrown out of action and the machine may be fed with sheets of pasted paper placed upon the table 11.

We do not confine ourselves to the use of springs W for pushing the halves of the mandrel together, as other devices—such as weights—might be used, or the face-cams might be duplicated or made double-acting, so as to give a positive motion to the halves of the mandrel in each direction.

The paper cutting off and coiling devices can operate upon dry paper as well as upon wet and pasted paper, so that the machine can be used to make tubes of dry material, the last lap only of which is secured to the tube by devices which do not form a part of the present invention.

What we claim is—

1. In a tube-machine, the combination, with a device for unwinding paper from a roll, such as an oscillating cylinder provided with longitudinal openings for the paper to pass diagonally through it, of a brake for holding the unwound end of the paper while the said device is turning the roll, substantially as set forth.

2. In a tube-machine, the combination, with an oscillating unwinding-cylinder provided with openings for the paper to pass through and with rollers journaled in the said openings, of a brake holding the unwound end of the paper, whereby the paper may be unwound from a roll, substantially as set forth.

3. In a tube-machine, the combination, with a cylinder provided with openings for the paper to pass through it and an eccentric and a rod for oscillating the said cylinder, of a brake and a cam for operating the said brake and causing it to hold the unwound end while the paper is being unwound from the roll by the said cylinder and releasing it as soon as the cylinder commences its return movement.

4. In a tube-machine, the combination, with an oscillating cylinder provided with openings for the paper to pass through it and a shaft supporting said cylinder, of a brake-roller, a brake for holding the unwound end of the paper against said roller and provided with levers at each end pivoted upon the said shaft, and revolving cams for operating the brake-levers at intervals, substantially as and for the purpose set forth.

5. In a tube-machine, the combination, with a horizontal lower knife-blade, of a horizontal upper knife-blade, one of the said blades being provided with a concave cutting-edge, and vertically-movable rods connected to each end of both blades for moving them vertically and simultaneously in opposite directions, substantially as set forth.

6. In a tube-machine, the combination, with an upper and a lower knife-blade provided with blocks at each end, of the stationary vertical guides for said blocks to slide upon, the revoluble cams, and the rods secured to the said blocks and provided with rollers engaging with the said cams, whereby both blades may be caused to approach and recede from each other, substantially as and for the purpose set forth.

7. In a tube-machine, the combination, with an oscillating cylinder and a brake for unwinding paper from a roll, of reciprocating knife-blades adapted for cutting wet paper, and a pasting device, such as a roller, arranged intermediate between the said unwinding and cutting-off devices for applying liquid adhesive material to the surface of the paper, substantially as set forth.

8. In a tube-machine, the combination, with an oscillating cylinder and a brake for unwinding paper from a roll, of reciprocating knife-blades adapted for cutting wet paper, traction devices for drawing the slack paper between the said knife-blades, a pasting device, such as a roller, intermediate between the said unwinding and cutting-off devices for coating the paper with adhesive material, and a table for the wet paper to rest on after a sheet has been cut off by the said knife-blades.

9. In a tube-machine, the combination, with a frame, of a revoluble shaft journaled in the said frame, an oscillating cylinder for unwinding paper from a roll, a brake-roller, a brake provided with pivoted levers at each end, a paste-roller for the paper to pass over, a guide-roller journaled in the frame for reversing the direction of the paper, a table for the wet paper to rest on, reciprocating knife-blades at the front end of said table, devices for drawing the slack paper between the knife-blades, and operating devices, such as eccentrics and cams, secured upon the said shaft for oscillating the unwinding-cylinder, working the brake-levers, and reciprocating the knife-blades at appropriate intervals, substantially as set forth.

10. In a tube-machine, the combination, with the sliding cross-heads and the operating-levers pivotally connected thereto, of the rock-shafts journaled in the said cross-heads and provided with opposed grip-levers for seizing the paper, the levers secured to the said rock-shafts, and the links pivoted together and to the ends of the said levers for operating the grip-levers simultaneously, substantially as set forth.

11. In a tube-machine, the combination, with the horizontal guides for supporting the gripping devices and the cross-heads sliding on the said guides and provided with pockets in their sides, of the rock-shafts journaled in the said cross-heads and provided with opposed grip-levers for seizing the paper, the levers secured to the ends of the said rock-shafts, the links pivoted at one end to the said levers, and pins pivoting the other ends of the said links together and provided with nuts sliding in the said pockets and adapted to limit the motion of the grip-levers, substantially as and for the purpose set forth.

12. In a tube-machine, the combination, with the horizontal guides for supporting the gripping devices and the cross-heads sliding on the said guides, of the rock-shafts journaled in the said cross-heads and provided with opposed grip-levers, the levers secured to the said rock-shafts, the links pivoted together and to the ends of the said levers, and the adjustable trip-blocks for the said levers to strike against, thereby automatically releasing the paper from the grip-levers.

13. In a tube-machine, the combination, with the horizontal guides and the gripping devices sliding thereupon and extending across the machine between the said guides, substantially as set forth, of the pivoted vibratory actuating-levers, each made in two parts, one part sliding longitudinally within the other, and having their free ends pivoted to the said gripping devices, and a rod extending crosswise between the two said actuating-levers, whereby they may be rocked simultaneously.

14. In a tube-machine, the combination, with a revoluble mandrel, of a conveyer consisting of a series of tapes traveling under the said mandrel and a feed-roller provided with a series of grooves for the said tapes to pass through and adapted to be moved to raise the said tapes and press the paper against the mandrel, substantially as set forth.

15. In a tube-machine, the combination, with a revoluble mandrel, of a feed-roller, the pivoted side arms supporting said roller, a pivoted arm below the side arms, a revoluble cam for operating the said arm and pressing the feed-roller toward the mandrel, and a spring interposed between the said side arms and the said lower arm, substantially as and for the purpose set forth.

16. In a tube-machine, the combination, with a revoluble mandrel, of a feed-roller adapted to press the paper against the said mandrel, the pivoted side arms supporting the said roller, a belt, and a belt-pulley secured concentric with the pivots supporting the side arms for imparting a continuous rotary motion to the said feed-roller, substantially as set forth.

17. In a tube-machine, the combination, with a revoluble mandrel, of a feed-roller, the pivoted side arms supporting the said roller, the cross-bar connecting the said side arms, a pivoted central arm under the cross-bar, a vertical rod depending from the cross-bar and passing through a hole in the central arm, a spring interposed between the said central arm and a shoulder on the said vertical rod, and a revoluble cam for raising the central arm at intervals and causing the feed-roller to press the paper against the mandrel, substantially as set forth.

18. In a tube-machine, a mandrel formed of two centrally-separable parts, one part having a tapering guide-pin at one end for entering a hollow in the end of the other part when the said parts are pushed together, substantially as set forth.

19. In a tube-machine, a mandrel formed of two centrally-separable parts, one part having a tapering guide-pin and a clutch-jaw at one end and the other part being provided with a corresponding clutch-jaw and a hollow for receiving the said guide-pin when the said parts are pushed together, substantially as set forth.

20. In a tube-machine, a hollow mandrel formed of two centrally-separable parts, each part being provided with longitudinal slots in one end, which divide it into a series of spring-segments for the paper to be wound upon, substantially as set forth.

21. In a tube-machine, a hollow mandrel formed of two centrally-separable parts, each part being provided with longitudinal slots in one end, which divide it into a series of spring-segments, and one part being provided with a tapering guide-pin at one end for entering the hollow in the end of the other part and keeping said parts in line and truly cylindrical when pushed together, substantially as set forth.

22. In a tube-machine, the combination, with a revoluble mandrel, of an auxiliary feed-roller oscillating at intervals in a circular arc concentric with the said mandrel and adapted to press the paper against its surface, and a flexible conveyer passing under the mandrel and over the said feed-roller, substantially as set forth.

23. In a tube-machine, the combination, with a revoluble mandrel, of sleeves supporting the said mandrel and provided with disks, an auxiliary feed-roller journaled in the said disks and adapted to press the paper upon the mandrel, a flexible conveyer passing under the mandrel and over the said feed-roller, and driving mechanism operatively connected to the said sleeves for oscillating them simultaneously and causing the said roller to bend the paper around the mandrel, substantially as set forth.

24. In a tube-machine, the combination, with a revoluble mandrel, of two revoluble sleeves supporting the mandrel and provided with disks having radial slots in them, an auxiliary feed-roller journaled in the said slots, means, such as springs, for causing the said roller to press the paper against the mandrel, and a flexible conveyer passing under the mandrel and over the said feed-roller, substantially as set forth.

25. In a tube-machine, the combination, with the mandrel, the sleeves supporting the said mandrel, the auxiliary feed-roller supported by the said sleeves, and the flexible conveyer passing under the mandrel and over the said feed-roller, of the toothed wheels secured on the said sleeves, the shaft extending across the machine, the toothed wheels secured on the said shaft and gearing into the aforesaid toothed wheels, a revoluble cam, and intermediate driving mechanism operatively connecting the said cam with the said shaft, whereby the said feed-roller may be oscillated concentric with the mandrel, substantially as set forth.

26. In a tube-machine, the combination, with the oscillatory shaft for operating the auxiliary feed-roller and extending across the machine, of similar toothed pinions secured upon the opposite ends of the shaft, the revoluble cams, the vertical bars, each formed of two adjustable parts, the bolts passing through slots in the meeting parts of the bars, whereby the length of each bar may be separately and accurately adjusted, the racks on the upper ends of the bars engaging with the said pinions, the rollers at the lower ends of the bars for bearing on the cams, and the separate guides projecting from each frame above and below the joints in the middle parts of the said rods for permitting free access to the said bolts, substantially as set forth.

27. In a tube-machine, the combination, with the retractible mandrel-shafts journaled in line with each other at the opposite sides of the machine, of the mandrel formed of two centrally-separable parts and having its opposite ends removably connected to the said shafts, whereby the said shafts may have similarly-constructed mandrels of various diameters connected to them, substantially as set forth.

28. In a tube-machine, the combination, with the retractible mandrel-shafts journaled in line with each other at the opposite sides of the machine, of the mandrel formed of two centrally-separable parts provided, respectively, with right and left handed screws at their opposite ends for coupling them to the said shafts, whereby similarly-constructed mandrels of various diameters may be connected to the said shafts, substantially as set forth.

29. In a tube-machine, the combination, with the retractible mandrel-shafts journaled in line with each other at opposite sides of the machine and the mandrel formed of two centrally-separable parts and having its opposite ends secured to the said shafts, of the non-retractible toothed pinions splined to the said shafts, a revoluble shaft extending across the machine, and toothed wheels secured upon the said shaft and gearing into the said pinions, whereby the mandrel-shafts may be positively connected and revolved simultaneously with exactly equal velocity, substantially as set forth.

30. In a tube-machine, the combination, with the revoluble mandrel-shafts, of the stationary guides supported parallel with the said shafts, the carriers sliding on the said guides and longitudinally connected to the mandrel-shafts at each end, and driving mechanism operatively connected to the middle portions of the said carriers and causing them to slide back and forth simultaneously upon the guides and in opposite directions, substantially as set forth.

31. In a tube-machine, the combination, with the revoluble mandrel-shafts journaled in line with each other at opposite sides of the machine and the mandrel formed of two centrally-separable parts and having its opposite ends secured to the said shafts, of revoluble cams and similar intermediate mechanisms at each side of the machine positively and operatively connecting the said shafts with the said cams, whereby the said shafts may be simultaneously retracted and with equal speed, substantially as set forth.

32. In a tube-machine, the combination, with the revoluble mandrel-shafts, of the stationary guides parallel with the said shafts, the carriers sliding on the said guides, connected at each end with the said shafts, and provided with toothed racks, the toothed segments gearing into the said racks, the revoluble cams, and intermediate mechanisms operatively and positively connecting the said segments with the cams, whereby the mandrel-shafts may be retracted simultaneously and with equal speed, substantially as set forth.

33. In a tube-machine, the combination, with a stationary guide, of a carrier sliding on the said guide and provided with a toothed rack, a mandrel-shaft journaled in the said carrier and provided with collars engaging with the carrier, the one half of a centrally-separable mandrel secured to the said shaft, a vertical shaft, a toothed segment secured on the said shaft and gearing into the said rack, an arm secured on the said shaft and carrying a roller, and a revoluble face-cam provided with a flat surface bearing against the said roller, and an inclined portion adapted to retract the mandrel-shaft at a certain point of the revolution of the cam, substantially as set forth.

34. In a tube-machine, the combination, with the mandrel-shafts journaled in line with each other and the mandrel formed of two centrally-separable parts and having its opposite ends secured to the said shafts, of revoluble cams and intermediate driving mechanism operatively connecting the said cams with the said shafts, whereby the said shafts may be retracted, and automatic returning devices, such as springs, for restoring the said parts to their original positions when released from the action of the cams, substantially as and for the purpose set forth.

35. In a tube-machine, the combination, with the sleeves supported in the frame, of the mandrel formed of two parts and journaled in the said sleeves, each part being provided with a series of spring-segments upon which the paper is wound, said segments having a slightly larger outer diameter than the hole in the said sleeve, whereby the said spring-segments may be compressed to release the tube when the parts of the mandrel are retracted through the said holes in the sleeves, substantially as set forth.

36. In a tube-machine, the combination, with a revoluble mandrel formed of two retractible parts and a driving-shaft and intermediate mechanism for revolving the mandrel continuously, of feeding devices for lapping the paper on the mandrel, and driving mechanism for actuating said feeding devices intermittently, intermittently-operating retracting devices for separating the parts of the mandrel simultaneously, and intermediate driving mechanism connecting the last said driving mechanism and the retracting devices with the said mandrel-driving shaft, substantially as and for the purpose set forth.

37. In a tube-machine, the combination, with a revoluble mandrel formed of two retractible parts, and feeding devices, substantially as described, for lapping the paper upon the said mandrel, of a conveyer extending horizontally under the mandrel for carrying the sheets of paper to the feeding devices and subsequently removing the paper tubes which fall upon its surface when the parts of the mandrel are retracted, substantially as set forth.

38. In a tube-machine, the combination, with devices, substantially as described, for unwinding paper from a roll, of a roller for coating the unwound paper with adhesive material, shears for separating the pasted paper into sheets, sliding gripping-jaws for drawing the slack paper over the pasting-roller and between the shears, a conveyer for receiving the cut-off sheets, feeding devices, substantially as described, for taking the sheets of paper from the conveyer and lapping them around a mandrel, a revoluble mandrel formed of two separable parts for forming the paper sheets into tubes, and retracting mechanism for separating the parts of the said mandrel, thereby releasing the said tubes, all the said elements being connected to a single driving-shaft by intermediate driving mechanisms and adapted to operate automatically and in rotation, substantially as hereinbefore described.

In testimony whereof we affix our signatures in presence of two witnesses.

THOMAS M. MACNAIR.
FRANCIS WOOD.

Witnesses:
JOHN C. McGALDRICK,
CHAS. A. BOGUE.